United States Patent [19]

Masuda et al.

[11] Patent Number: 5,532,049

[45] Date of Patent: Jul. 2, 1996

[54] MAGNETIC RECORDING MEDIUM HAVING A CALENDERED POLYESTER LAYER WITH A SPECIFIED DEFORMATION RATIO

[75] Inventors: Narihiro Masuda; Chikakazu Kawaguchi, both of Nagahama, Japan

[73] Assignee: Diafoil Hoechst Company, Limited, Tokyo, Japan

[21] Appl. No.: 329,156

[22] Filed: Oct. 25, 1994

[30] Foreign Application Priority Data

Nov. 1, 1993 [JP] Japan .................................. 5-273753
May 25, 1994 [JP] Japan .................................. 6-110867

[51] Int. Cl.⁶ .................................................. G11B 5/704
[52] U.S. Cl. ...................... 428/216; 428/323; 428/336; 428/480; 428/694 SL; 428/694 BS; 428/900
[58] Field of Search ................................. 428/216, 480, 428/694 SL, 900, 694 BS, 323, 336

[56] References Cited

U.S. PATENT DOCUMENTS

| | | | |
|---|---|---|---|
| 4,687,700 | 8/1987 | Hensel et al. | 428/213 |
| 5,324,571 | 6/1994 | Koyama et al. | 428/212 |
| 5,340,635 | 8/1994 | Isobe et al. | 428/141 |
| 5,358,777 | 10/1994 | Kojima et al. | 428/212 |
| 5,364,684 | 11/1994 | Sakamoto et al. | 428/141 |

FOREIGN PATENT DOCUMENTS 4-271016 9/1992 Japan .
5-28464 2/1993 Japan .

*Primary Examiner*—Stevan A. Resan
*Attorney, Agent, or Firm*—Foley & Lardner

[57] ABSTRACT

The disclosure describes a high-density magnetic recording medium comprising a biaxially oriented, laminated polyester film which is coextruded, so that a polyester A layer subject to plastic deformation by calendering treatment forms one of the surfaces of a base film, and a magnetic layer formed on the surface of the polyester A layer and composed of a magnetic substance dispersed in a resin binder, the thickness ($t_A$) of the polyester A layer and the thickness ($t_M$) of the magnetic layer satisfying the following formulae at the same time.

$0.01 \ \mu m \leq t_M \leq 2.0 \ \mu m$ (1)

$0.05 \ \mu m \leq t_A$ (2)

$t_A + t_M \leq 5 \ \mu m$ (3).

10 Claims, No Drawings

MAGNETIC RECORDING MEDIUM HAVING A CALENDERED POLYESTER LAYER WITH A SPECIFIED DEFORMATION RATIO

BACKGROUND OF THE INVENTION

The present invention relates to a magnetic recording medium suited for high-density recording.

In the magnetic recording media such as VTR tapes, audio tapes and computer tapes, the necessity is rising recently for higher recording density in order to satisfy the requests for higher performance, longer recording time and smaller lightweight. Shortening of recording wavelength is essential for realizing high-density recording, but when the magnetic layer has a greater thickness than a certain level in relation to the recording wavelength, the flux of the magnetic substance in the deep layer is unable to pass the head and consequently forms a closed loop. Thus, this magnetic flux turns up a loss, since it does not pass the head core. In principle, therefore, the shorter the recording wavelength is, the smaller should be the thickness of the magnetic layer.

In line with this concept, there has been developed a so-called ME (metal evaporation)-type magnetic recording medium in which the recording layer is strikingly reduced in thickness by vapor depositing or sputtering a ferromagnetic metal in order to realize a remarkable reduction of the thickness loss resulting from shortening of recording wavelength. This ME-type magnetic recording medium, however, is at a disadvantage in that the thin ferromagnetic metal film composed of cobalt, nickel or a mixture thereof as magnetic substance tends to rust. Although various improvements have been made, such magnetic recording medium still lacks reliability for the long-time retention of recordings.

In the case of using MP (metal powder)-type magnetic recording medium in which a magnetic substance of a ferromagnetic metal dispersed in a resin binder is coated on a base film, it is relatively easy to cope with rusting, for instance, the rusting can be prevented by forming an antioxidant film on the metal particle surfaces. However, in the case of using the coating-type magnetic recording media, certain problems in production such as formation of pinholes or streaks, tend to arise when the thickness of the magnetic layer is reduced. It is also a hindrance to thickness reduction of the magnetic layer that the packing ratio of the magnetic substance can not be increased because of using a resin binder containing various additives.

For overcoming these disadvantages of the coating-type magnetic recording media, there has been proposed a magnetic recording medium in which a magnetic layer composed of two layers is coated on the base film, the lower non-magnetic layer being formed on the base film and then the upper magnetic layer being formed on the on said non-magnetic layer (Japanese Patent Application Laid-Open (KOKAI) No. 4-271016 and 5-28464). However, when the magnetic layer is coated immediately after the lower non-magnetic layer is coated on the based film, there tends to take place disarrangement of interface between the lower non-magnetic layer and the upper magnetic layer, resulting in generation of tape modulation noise. Even when using a method in which the lower non-magnetic layer is first coated and then, while this layer is still in a wet state, the upper magnetic layer is coated thereon, it is still impossible to perfectly prevent such disarrangement of interface therebetween. Thus, there has been room for improvement in the coating-type magnetic recording media.

As a result of intensive researches for solving these prior art problems, it has been found that by forming a magnetic layer comprising a magnetic substance dispersed in a resin binder on the surface of a polyester layer (polyester A layer ) constituting a laminated polyester base film which has been coextruded, so that the polyester A layer subject to plastic deformation by calendering treatment forms one of the surfaces thereof, the said magnetic layer having a thickness of 0.01 to 2.0 μm, the said polyester A layer having a thickness of not less than 0.05 μm, the sum of the thickness of the said magnetic layer and the thickness of the said polyester A layer being not more than 5 μm, the obtained recording medium has an excellent flatness of the magnetic layer surface even when its thickness is reduced, and is very suited as a high-density magnetic recording medium for short wavelength recording. The present invention has been attained on the basis of this finding.

SUMMARY OF THE INVENTION

An object of the present invention is to provide a magnetic recording medium suited for high-density recording.

Another object of the present invention is to provide a magnetic recording medium capable of high-density short-wavelength recording even when the thickness of the magnetic layer is reduced for minimizing the thickness loss.

To achieve the aims, in an aspect of the present invention, there is provided a high-density magnetic recording medium comprising a biaxially oriented, laminated polyester film which is coextruded, so that a polyester A layer subject to plastic deformation by calendering treatment forms one of the surfaces of a base film, and a magnetic layer formed on the surface of the polyester A layer and composed of a magnetic substance dispersed in a resin binder, the thickness ($t_A$) of the polyester A layer and the thickness ($t_M$) of the magnetic layer satisfying the following formulae at the same time.

$$0.01 \text{ μm} \leq t_M \leq 2.0 \text{ μm} \tag{1}$$

$$0.05 \text{ μm} \leq t_A \tag{2}$$

$$t_A + t_M \leq 5 \text{ μm} \tag{3}$$

DETAILED DESCRIPTION OF THE INVENTION

The magnetic recording medium according to the present invention comprises as a substrate a biaxially oriented, laminated polyester film. It is essential that this biaxially oriented, laminated polyester film has, in one of its surfaces, a polyester A layer subject to plastic deformation by calendering treatment, which polyester A layer has been laminated by coextrusion (this biaxially oriented polyester film having the polyester A layer laminated by coextrusion may hereinafter be referred to simply as "base film").

In the present invention, a magnetic coating material is applied on the surface of the said polyester A layer (hereinafter may be referred to simply as "A layer"), and the coated layer is flattened by calendering treatment. Thus, the polyester A layer needs to have sufficient adhesiveness to the magnetic coating material and be capable of being plastically deformed and flattened by calendering treatment. The degree of plastic deformation of the polyester A layer used in the present invention should be such that the plastic deformation ratio defined later is less than 0.94, preferably less than 0.80, more preferably less than 0.50. An effective method for causing plastic deformation by calendering treatment is to copolymerize a diol and a dicarboxylic acid so as to lessen crystallizability and reduce glass transition temperature of the polyester.

The polyester usable for the above purpose can be obtained by polycondensing a diol and a dicarboxylic acid. The diols usable for the polycondensation include ethylene glycol, propanediol, butanediol, neopentyl glycol, pentanediol, hexanediol, octanediol, decanediol, cyclohexanedimethanol, diethylene glycol, triethylene glycol, polyethylene glycol, tetramethylene glycol and the like. The dicarboxylic acids usable for the polycondensation include terephthalic acid, isophthalic acid, phthalic acid, naphthalenedicarboxylic acid, 4-sulfonylisophthalic acid metal salts, biphenyl-dicarboxylic acid, succinic acid, glutaric acid, adipic acid, cyclohexanedicarboxylic acid, oxalic acid, malonic acid and the like. Some of the homopolyesters, such as whole aliphatic polyesters, can be plastically deformed by calendering treatment. In case these polyesters have crystallizability, their crystal melting point is preferably in the range of 50° to 270° C., more preferably 60° to 230° C.

Usually, the calendering treatment is carried out at 60° to 100° C. under a linear pressure of about 100 to 300 kg/cm. Therefore, for allowing the polyester A layer to have plastic deformation, the polyester composition is preferably selected so that the polyester constituting the A layer has a glass transition temperature of not more than 60° C., preferably not more than 50° C. and a Vicat softening temperature of not more than 60° C., preferably not more than 50° C., The polyester A layer may contain known organic additives such as lubricants, antistatic agents and antioxidants. Examples of the lubricants and antistatic agents usable here include higher fatty acid metal salts or ester compounds, alkylbenzenesulfonic acid metal salts or ester compounds, higher aliphatic phosphonium salts, higher aliphatic ammonium salts, higher fatty acid amides, silicone-based or modified silicone-based lubricants, polyglycols, and their fluorine-containing compounds. It is recommended to select those additives which are not thermally deteriorated during melt extrusion, since the polyester A layer is formed by coextrusion.

The base film of the magnetic recording medium according to the present invention is of a structure having the polyester A layer at one of its surfaces. Specifically, it has an A/B laminated structure composed of the polyester A layer and the adjoining polyester layer (hereinafter referred to as "polyester B layer" or simply as "B layer"). The polyester B layer may have itself a laminated structure. In the case of an A/B/A laminated structure in which the polyester A layer is provided on both sides of the base film, when the calendering treatment is carried out after forming the magnetic layer on one side thereof, there may take place undesirable phenomena such as sticking of the calender rolls to the A layer having no magnetic layer, or sticking between the magnetic layer and the A layer having no magnetic layer when the obtained magnetic film is taken up, so that it is preferable to provide the polyester A layer at one side alone of the base film.

The laminated structure of the base film is formed by a coextrusion method in which a ply forming the polyester A layer and a ply forming the polyester B layer are joined and laminated in a die when they are melt extruded. For laminating the polyester A layer on the polyester B layer, the coextrusion method is most preferred in view of precision of thickness of the polyester A layer or adhesion between the layers A and B, although other methods such as a coating method, an extruding lamination method and a dry lamination method are usable, in principle. Further, since a magnetic coating material containing a large amount of organic solvent is coated on the surface of the A layer, the separation of the A layer from the B layer may be caused by the organic solvent in the coating or lamination method, so that for the base film for magnetic recording media according to the present invention, it is necessary to laminate of the layers A and B by coextrusion method. It is possible to apply additional coating treatment on the surface of the coextruded, laminated film, and such coating treatment may be conducted on the A layer surface and/or the B layer surface for the specific purpose such as prevention of static charging or oxidation, improvement of moisture resistance, etc. For such coating treatment, there can be employed a so-called in-line coating method in which the coating agent is applied as a water dispersion in the base film forming step and the coated film is further stretched.

The polyester B layer of the base film is preferably composed of polyethylene terephthalate (PET) or polyethylene naphthalate (PEN), but other materials such as copolymerized resins of components used for the polyester A layer, may be contained in an amount not exceeding 10 mol %. It is notable that part of the scraps produced in the base film-forming step can be recycled as the raw material for the polyester B layer, and in this case the copolymer used for the polyester A layer may be mixed in the recycled material.

The polyester B layer of the base film may contain the fine particles which are generally known and can be added to the polyester films. As such fine particles, for example, particles of titanium oxide, carbon black, calcium carbonate, barium sulfate or the like may be contained for the purpose of imparting a light-shielding property to the base film. Also, particles of calcium carbonate, calcium phosphate, barium sulfate, titanium oxide, kaolin, talc, clay, alumina, silica, carbon black or other crosslinked organic particles such as particles of crosslinked polystyrene resin or crosslinked acrylic resin may be incorporated in the polyester layer for the purpose of imparting a desired slipping property to the film. The fine particles are used singly or by as a mixture of two or more of them. As for the particle size and the amount of the fine particles added, usually particles having an average size of 0.001 to 5.0 µm, preferably 0.01 to 1.0 µm, are added in an amount of not more than 10 wt %, preferably not more than 5 wt %. In case the polyester B layer itself is of a laminated structure, the fine particles may be added either to the entirety of the B layer or only to the surface layer of the B layer, or they may be added to the intermediate layer of the B layer alone. Also, if necessary, two kinds of the fine particles may be added to each of the surface layer and the intermediate layer.

The base film of the magnetic recording medium according to the present invention needs to be biaxially oriented by biaxial drawing, so that the base film has a Young's modulus of not less than 350 kg/mm$^2$, preferably not less than 450 kg/mm$^2$ in the machine direction. In case where it is necessary to reduce the thickness of the base film for long-time recording, it is preferable that the base film has a Young's modulus of not less than 500 kg/mm$^2$ in the machine direction. This Young's modulus may be imparted by re-drawing, and such re-drawing may be conducted either in the machine direction or in the transverse direction or in both directions.

The Young's modulus in the longitudinal direction (corresponding to the machine direction of the base film) of the magnetic recording medium of the present invention composed of the base film and the a magnetic layer formed on the surface of the A layer thereof, is not less than 350 kg/mm², preferably not less than 400 kg/mm², more preferably not less than 450 kg/mm². For obtaining this Young's modulus, it is necessary to use a base film with a high Young's modulus and to reduce the total thickness ($t_A+t_M$) Of the A layer and the magnetic layer. When the Young's modulus in the longitudinal direction of the magnetic recording medium is less than 350 kg/mm², the medium may be elongated during recording or reproducing.

In case the magnetic recording medium is a magnetic tape, when the Young's modulus in the width direction is too small, there may take place undesirable phenomena such as deterioration of a slitting property and damage to the tape edge. Therefore, the Young's modulus in the transverse direction of the base film according to the present invention is preferably not less than 350 kg/mm², more preferably not more than 450 kg/mm². Further, the sum of the Young's modulus in the machine direction and the Young's modulus in the transverse direction of the base film according to the present invention is preferably not less than 700 kg/mm², preferably not less than 800 kg/mm².

After biaxial drawing, the obtained film is usually heat-set. By heat-setting, the polyester A layer of the base film is melted or softened to make planer orientation substantially zero. In case the polyester forming the A layer has crystallizability, it is preferable to bring the polyester A layer into an amorphous state as much as possible by suitable means such as rapid cooling of the film after completion of heat-setting. The heat-setting is conducted such that the shrink of the film after 3-minute heat-treatment at 100° C. become not more than 2.0% in both machine and transverse directions.

The magnetic layer of the magnetic recording medium of the present invention comprises a magnetic substance dispersed in a resin binder.

The magnetic substance used in the present invention may be a known ferromagnetic powder for high-density magnetic recording. For example, acicular particles of γ-iron oxide, Co-added γ-iron oxide and chrome oxide can be cited as examples of the metal oxide-based or different metal-added metal iron oxide-based magnetic substances. Cobalt, nickel, iron and alloys thereof or alloys of the said metals and chromium or tungsten are the examples of ferromagnetic metals, and plate-like particles of barium ferrite and strontium ferrite can be cited as examples of hexagonal ferrite-based magnetic substances. These ferromagnetic powders preferably have an coercive force (Hc) of not less than 1,000 Oe, more preferably not less than 1,200 Oe. The ferromagnetic metal powders having a known anti-oxidant film coated on their surfaces are especially preferred.

The resin binder used for dispersing the ferromagnetic powders such as mentioned above and organic or inorganic additives such as crosslinking agent, lubricant, antistatic agent, abrasive, antioxidant, antiseptic, etc., may all be of the known ones.

Also, known methods may be employed for coating the surface of the polyester A layer of the base film with a magnetic coating material composed of the said magnetic substance, resin binder and additives.

The magnetic coating is subjected to magnetic field orientation of the magnetic substance, and after the solvent has been evaporated away, the coating is calendered in order to have its surface flattened by a known method such as a method using supercalender rolls. The calendering treatment is carried out at not less than 70° C., preferably 80° to 100° C., under a pressure of not less than 200 kg/cm, preferably 300 to 400 kg/cm (expressed as linear pressure) to cause desired plastic deformation of the polyester A layer. If the polyester A layer fails to undergo plastic deformation by calendering treatment, the surface of the magnetic layer formed on the surface of the A layer is toughened true to the unevenness of the base film to invite deterioration of the signal recording property (electromagnetic conversion property).

The thickness [$t_A$ (μm)] of the polyester A layer and the thickness [$t_M$ (μm)] of the magnetic layer formed on the surface of the A layer should satisfy the following formulae at the same time:

$$0.01 \leq t_M \leq 2.0 \quad (1)$$

$$0.05 \leq t_A \quad (2)$$

$$t_A+t_M \quad (3)$$

In the above formula (1), if the $t_M$ is more than 2.0 μm, the magnetic substance in the deep layer tends to form a closed loop in short wavelength recording, and conversely if the $t_M$ is less than 0.01 μm, the output characteristics of the produced magnetic recording medium are intolerably deteriorated. In the formula (2), if the $t_A$ is less than 0.05 μm, the flattening of the coating layer by calendering treatment may be unsatisfactory. In the formula (3), if the sum of the $t_A$ and the $t_M$ is more than 5 μm, there may arise the adverse effects such as too large thickness of the magnetic recording medium as a whole and its reduced strength. Preferably, $t_A+t_M \leq 4$ μm.

In the magnetic recording medium of the present invention, a known back coating layer may be formed on the surface opposite of the A layer from the magnetic layer. This back coating layer comprises a resin binder and fine particles of carbon black, alumina or the like and additives such as antistatic agent, lubricant, etc., which are blended in the resin binder and are same as used for base film coating, for the purpose of improving the running property of the magnetic tape.

A process for forming the base film used in the magnetic recording medium according to the present invention is described below.

The resin for the polyester A layer and the resin for the polyester B layer are separately dried, extruded from the separate extruders, then laminated before the diehead by a feed block-type coextruder or in the die by a multi-manifold-type coextruder and melt-extruded into a sheet, and cooled and solidified on a casting drum to form a non-stretched film. It is recommended to use electrostatic pinning method for cooling and solidification, thereby obtaining good flatness of the film. It is also preferable to install a #1200-mesh or smaller mesh-size filter to the extruder for the A layer and a #600-mesh or smaller mesh-size filter to the extruder for the B layer in order to carry out extrusion while filtering the feedstock for preventing contamination and reducing dropout. It is further preferable to install a static mixer and a metering pump to each melt line for obtaining a better uniformity of the produced films and film thickness.

The thus obtained non-drawn film is then biaxially drawn in order to orient biaxially. The drawing is preferably carried out according to a so-called successive biaxial drawing method in which the film is first drawn in the machine direction and then drawn in the transverse direction. The drawing in the machine direction is conducted at a temperature of 50° to 180° C. for a drawing ratio of 2.0 to 9.0 times, these conditions being properly selected in consideration of polyester composition. This drawing may be accomplished in a single stage, but when the working temperature and the drawing ratio are within the above-defined ranges, the drawing is preferably performed in two or more stages for betterment of thickness uniformity of the polyester A layer. The working temperature may be the same or different from stage to stage. The drawing rate is preferably in the range of 5,000 to 500,000%/min for obtaining good thickness uniformity of the whole film.

Tentering is usually employed for drawing in the width direction (transverse direction). This drawing is preferably carried out at a temperature of 80° to 170° C. and a drawing rate of 100 to 200,000%/min for a drawing ratio of 3.0 to 6.0 times. Thereafter, the film may be re-drawn in the machine direction, transverse direction or in both directions, as desired. The drawn film is then heat-set at a temperature of 120° to 250° C., preferably 180° to 240° C. for a period of preferably 1 to 60 seconds.

In the magnetic recording medium of the present invention, since the surface of the base film is formed with a polyester capable of plastic deformation by calendering treatment, both the magnetic layer formed on the surface of the base film and the polyester layer can be flattened at the same time by calendering treatment. Therefore, the surface of the magnetic layer can be effectively flattened even when its thickness was reduced for minimizing the thickness loss, so that the recording medium of the present invention can be advantageously used as a high-density recording medium required for short wavelength recording.

Further, since the polyester A layer capable of plastic deformation by calendering treatment is formed as base film by coextrusion, no difficulty is involved in control of extruding operation unlike in the case of the conventional multi-layer coating-type magnetic layer, and it is possible to produce a high-density recording medium at high efficiency according to the same process as generally used in the art.

Thus, the magnetic recording medium according to the present invention is useful not only as VHS-VTR tape but also for various other types of magnetic recording media such as S-VHS tape, W-VHS tape, 8 mm film, high-band 8 mm film, digital VTR tape for HDTV, digital VTR tape for business use, computer tape, floppy disc, etc.

EXAMPLES

The present invention is further illustrated below with reference to the examples thereof, which examples, however, are merely intended to be illustrative and not to be construed as limiting the scope of the invention.

The methods used for determining the properties of the base films and the magnetic recording media in the Examples and the Comparative Examples are described below.

All "parts" in the Examples are "part by weight", unless otherwise noted.

(1) Layer thickness

Each sample of magnetic tape or polyester base film was fixed by embedding in a resin, so that a section in the thickness direction could be observed, and a 100 nm-thick piece was cut out by using a microtome (manufactured by E. I. du Pont de Nemours and Company) and observed under a transmission electron microscope (H-9000, manufactured by Hitachi Corp.) (magnification: ×10,000 to 20,000, accelerating voltage: 100 kV). The sample piece was microphotographed at 50 spots. The thicknesses of the respective laminations were measured from the microphotographs and the average value was determined.

(2) Degree of plastic deformation by calendering treatment (plastic deformation ratio)

A section of each sample was microphotographed in the same method as employed for the determination of layer thickness in (1) above. 20 spots where the particles in the B layer stayed within 1 μm from the interface with the A layer were photographed. The thickness of the A layer at the top of the projections formed on the film surface by the particles in the B layer and the thickness of the A layer at the part free of the projections were compared and their plastic deformation ratio (thickness at the top/thickness at the part free of projections) was determined, followed by calculation of the average. The degree of plastic deformation was indicated according to the following criterion.

| Plastic deformation ratio | Ranking of the degree of plastic deformation |
| --- | --- |
| not less than 0.95 to 1.00 | D |
| not less than 0.80 to less than 0.95 | C |
| not less than 0.50 to less than 0.80 | B |
| less than 0.50 | A |

(3) Center plane average roughness (SRa) of magnetic layer surface

The center plane average roughness (SRa) of the magnetic layer surface of each sample of magnetic recording medium was measured by using a non-contact roughness tester (a three-dimensional roughness tester: MAXIM IIID 5800, manufactured by Zygo Ltd.).

(4) RF output at 7.7 MHz

For evaluation of the signal recording property, the RF output in recording and reproducing of a single sine wave of 7.7 MHz (recording wavelength on the tape=about 0.5 μm) was measured by using a high-band 8 mm-video deck (EV-S900, manufactured by Sony Corp.) and a color video noise meter (Model 925C, manufactured by Shibasoku Co., Ltd.). The RF output was shown by a relative value (dB), supposing that the RF output of the tape of Example 1 is 0.0 dB.

(5) Tape modulation noise

Tape modulation noise was measured with the same system as used for measurement of RF output in (4) above. C/N ratio of the frequency 0.1 MHz apart from the noise spectrum observed in recording and reproducing of a single sine wave of 7.7 MHz was read and shown by a relative value (dB), supposing that the modulation noise of the tape of Example 1 is 0.0 dB.

(6) Young's modulus

By using a tensile testing machine (Intesco Model 2001, manufactured by Intesco Co., Ltd.), a 300 mm-long sample was pulled at a strain rate of 10%/min in a room adjusted to 23° C. and 50% RH. By using the initial straight line section of the obtained tensile stress-strain curve, the Young's modulus was calculated from the following equation:

$$E = \Delta\sigma/\Delta\epsilon$$

wherein E is Young's modulus (kg/mm$^2$), $\Delta\sigma$ is difference in stress according to the original average sectional area, between two points on the straight line, and $\Delta\epsilon$ is difference in strain between the same two points.

The sample width was 20 mm in the case of base film and equal to the tape width in the case of magnetic tape. In the case of the magnetic tape, the average sectional area was calculated including the magnetic layer. The sum of the Young's modulus in the machine direction and the Young's modulus in the transverse direction was determined by adding up the values obtained from the separate determinations of Young's modulus in the respective directions.

Examples 1 and 2

<Preparation of polyester resin>
Polyester. 1

80 parts of dimethyl terephthalate, 20 parts of dimethyl isophthalate, 16 parts of ethylene glycol, 70 parts of 1,4-butanediol and 0.09 parts of magnesium acetate were inserted in a reactor and heated to carry out an ester exchange reaction, while evaporating away methanol. Approximately 4 hours were required from after the reaction started until the temperature thereof reached 230° C., at which point the ester exchange reaction was substantially completed. Thereafter, 0.4 parts of ethyl acid phosphate and 0.04 parts of antimony trioxide were added thereto and the resultant mixture was further heated while gradually reducing the pressure of the reaction system from normal pressure until the temperature and pressure finally reached 280° C. and 1 mmHg. Four hours later, the reaction system was returned to normal pressure to obtain polyester 1 resin.
Polyester 2

100 parts of dimethyl terephthalate, 65 parts of ethylene glycol and 0.09 parts of magnesium acetate were inserted in a reactor and heated to carry out an ester exchange react ion while evaporating away methanol. Approximately 4 hours were required from after the reaction started until the temperature reached 230° C. at which point the ester exchange reaction was substantially completed. Thereafter, 0.4 parts of ethyl acid phosphate and 0.04 parts of antimony trioxide were added thereto and the resultant mixture was further heated while gradually reducing the pressure of the reaction system from normal pressure until the temperature and pressure finally reached 285° C. and 1 mmHg. Four hours later, the reaction system was returned to normal pressure to obtain polyester 2 resin.
Polyester 3

To the polyester 2 resin was added 0.5 wt % of carbon black having an average primary particle size of 0.04 μm, and the resultant mixture was kneaded and dispersed by using a twin-screw extruder to obtain polyester 3 resin.
<Production of polyester film>

Polyester 1 resin for the A layer and polyester 3 resin for the B layer were separately dried at 180° C. for 4 hours and melt-extruded at 290° C. by a two-layer coextruder. Both polyesters resin were screened by a #2000-mesh filter and then laminated by a feed block to form an A/B laminated structure. The laminated polyester was extruded into a sheet-form from the die and then cooled and solidified on a 50° C.-casting roll by applying an electrostatic pinning method to obtain a two-layer structured, non-drawn sheet. The discharge rate of each extruder was adjusted so that the A layer would have a thickness shown in Table 1. This non-drawn sheet was drawn 2.9 times in the machine direction at 83° C. and then further drawn 1.3 times at 76° C. by roll drawing method. The resulting film was drawn 4.0 times in the transverse direction at 110° C. by using a tenter, and then heat-set at 210° C. for 15 seconds to obtain a biaxially oriented film with an overall thickness of 10 μm. The Young's modulus (sum of moduli in the machine and transverse directions) of the obtained film (base film) was 820 kg/mm² in Example 1 and 880 kg/mm² in Example 2.
<Production of magnetic tape>

A magnetic coating material having the composition shown below was mixed and dispersed for 60 hours in a ball mill, then 5 parts of polyisocyanate was added thereto and the resultant mixture was further mixed and dispersed, and then passed through a filter having an average mesh size of 1 μm.

| | |
|---|---|
| Acicular Fe-based alloy magnetic powder (Hc = 1,450 Oe; oxide coating film on surface; aspect ratio = 9:1) | 100 parts |
| Vinyl chloride resin | 10 parts |
| Polyurethane resin | 5 parts |
| Carbon black | 3 parts |
| Stearic acid | 1 part |
| Butyl stearate | 1 part |
| α-alumina | 3 parts |
| Toluene | 100 parts |
| Methyl ethyl ketone | 100 parts |
| Cyclohexanone | 50 parts |

This magnetic coating material was applied on the surface of the polyester A layer of the biaxially oriented polyester film, so that the coating thickness after drying had the value shown in Table 1, and the coating was subjected to magnetic field orientation, dried and calendered. Calender rolls composed of hard chrome-plated metal rolls and mating nylon rolls were used for calendering treatment. The metal rolls were kept at 80° C. and arranged, so that the magnetic coating material contacted with the rolls under a linear pressure of 300 kg/cm, and under this condition, plastic deformation and flattening of the polyester A layer and planishing of the magnetic layer were conducted simultaneously, thereby obtaining a magnetic tape.

A back coating material having the following composition, which had previously been mixed and dispersed for 48 hours in a ball mill, was applied on the non-magnetic side of the said magnetic tape so that the coating thickness after drying became 0.5 μm, and then dried.

| | |
|---|---|
| Carbon | 90 parts |
| Polyurethane resin | 60 parts |
| Methyl ethyl ketone | 300 parts |
| Toluene | 150 parts |

This magnetic tape was slit into an 8 mm-width and incorporated in an 8 mm-tape cassette to make a VTR tape.

The properties of this tape are shown in Table 1. Since the polyester A layer can be plastically deformed and flattened by calendering treatment, even if the magnetic layer thickness is less than 1 μm, the magnetic layer surface is also flat and consequently, the tape is improved in RF output and tape modulation noise characteristics.

Example 3

A non-drawn sheet was produced in accordance with Example 1, by using the same polyester resins for the layers A and B as employed in Example 1 and adjusting the discharge rate of each extruder so as to provide the A layer thickness shown in Table 1. This sheet was worked into a film in accordance with Example 1 by changing the film forming conditions as described below. That is, the sheet was first drawn 2.9 times in the machine direction at 83° C. and then further drawn 1.2 times at 75° C. by roll drawing method.

The obtained film was drawn 4.0 times in the transverse direction at 110° C. by using a tenter. Then, the obtained film was once cooled to room temperature and again drawn 1.25 times in the machine direction at 125° C. by using Teflon-made non-sticking rolls. The drawn film was heat-set at 210° C. for 15 seconds by using a tenter, thereby obtaining a biaxially oriented film having an overall thickness of 7 μm. The Young's modulus (sum of moduli in the machine and transverse directions) of the this film (base film) was 1,090 kg/mm².

The properties of the tape produced by using the said film are shown in Table 1. Since the polyester A layer can be plastically deformed and flattened by calendering treatment, even if the magnetic layer thickness is less than 1 μm, the magnetic layer surface is also flat, and accordingly, the obtained tape is remarkably improved in RF output and tape modulation noise level. Further, since the base film has a high Young's modulus, it was possible to reduce the thickness of the magnetic tape.

Example 4

A non-drawn sheet was produced by following the film forming procedure of Example 1, with the discharge rate of each extruder being adjusted so as to have the A layer thickness shown in Table 1. This sheet was drawn 2.9 times in the machine direction at 83° C. and then further drawn 1.2 times at 76° C. by roll drawing method. The obtained film was drawn 3.6 times in the width direction at 110° C. by using a tenter. The film was once cooled to room temperature and then again drawn 1.15 times in the machine direction at 125° C. by using Teflon-made non-sticking rolls. This film was drawn 1.25 times in the transverse direction at 190° C. by using a tenter. Thereafter, the drawn film was heat-set at 210° C. for 15 seconds by using a tenter to obtain a biaxially oriented film with an overall thickness of 7 μm. The Young's modulus (sum of moduli in the machine and transverse directions) of the obtained film (base film) was 1,150 kg/mm²

The properties of the magnetic tape produced by using the said film are shown in Table 1. Since the polyester A layer is capable of plastic deformation and flattening by calandaring treatment, even if the magnetic layer thickness is less than 1 μm, the magnetic layer surface is also flat, and as a result, the tape is improved in RF output and tape modulation noise level. Further, since the base film has a high Young's modulus, it was possible to reduce the thickness of the magnetic tape.

Example 5

<Preparation of polyester resin>
Polyester 4

100 parts of dimethyl 2,6-naphthalenedicarboxylate, 55 parts of ethylene glycol and 0.09 parts of magnesium acetate were inserted in a reactor and heated to carry out an ester exchange reaction while evaporating away methanol. Approximately 4 hours were required from after the reaction started until the temperature thereof reached 230° C., at which point the ester exchange reaction was substantially completed. Thereafter, 0.4 parts of ethyl acid phosphate and 0.04 parts of antimony trioxide were added thereto in the form of an ethylene glycol slurry and spherical silica having an average particle size of 0.3 μm was further added in the form of an ethylene glycol slurry so as to have in an amount of 0.3 wt % in the polymer, and the resultant mixture was heated while gradually reducing the pressure of the reaction system until the temperature and pressure finally reached 290° C. and 1 mmHg. Four hours later, the reaction system was returned to normal pressure to obtain a polyester prepolymer. This prepolymer was subjected to solid phase polymerization at 240° C. in a nitrogen stream for 7 hours to obtain polyethylene naphthalate (polyester 4 resin).
<Production of polyester film>

Polyester 1 resin of Example 1 for the A layer and polyester 4 resin for the B layer were separately dried at 180° C. for 4 hours and melt-extruded at 290° C. by a two-layer coextruder. Both polyesters were passed through a #2,000-mesh filter and laminated by a feed block to form an A/B laminated structure. The laminated polyester was further extruded into a sheet-form from the die and then cooled and solidified on a 50° C.-casting roll by using an electrostatic pinning method to obtain a two-layer structured non-drawn sheet. The discharge rate of each extruder was adjusted so that the A layer would have the thickness shown in Table 1. This non-drawn sheet was drawn 4.1 times in the machine direction at 128° C. by roll drawing method using Teflon-made non-sticking rolls. The obtained film was drawn 4.5 times in the transverse direction at 135° C. by using a tenter. Thereafter, the film was again drawn 1.25 times in the machine direction at 153° C. by using Teflon-made non-sticking rolls. This film was heat-set at 210° C. for 15 seconds by using a tenter to obtain a biaxially oriented film having an overall thickness of 7 μm. The Young's modulus (sum of moduli in the machine and transverse directions) of this film (base film) was 1,180 kg/mm².
<Production of magnetic tape>

On this film were provided a magnetic layer and a back coat layer of the same compositions as used in Example 1 in the same method as Example 1, and the coated film was properly slit to make an 8 mm-VTR tape.

The properties of this tape are shown in Table 1. The polyester A layer can be plastically deformed and flattened, as in Examples 1 and 2, even if the B layer of the base film is composed of PEN and the magnetic layer thickness is not more than 1 μm, so that the magnetic layer surface is also flat and accordingly the tape is improved in RF output and tape modulation noise level. Further, since the base film has a high Young's modulus, it was possible to reduce the thickness of the magnetic tape.

Comparative Example 1

The same film forming procedure as Example 1 was carried out except for use of polyester 2 resin as the A layer-forming material to obtain a biaxially oriented polyester film having an A/B laminated structure with an overall thickness of 10 μm. The Young's modulus (sum of moduli in the machine and transverse directions) of this film (base film) was 1,040 kg/mm².

On this film were provided a magnetic layer and a back coating layer of the same compositions as used in Example 1 in the same method as Example 1, and the coated film was properly slit to make an 8 mm-VTR tape.

The properties of this VTR tape are shown in Table 2. Since the polyester A layer was made of PET, it could not be plastically deformed nor flattened by calendering treatment, so that the tape was poor in RF output and tape modulation noise level.

Comparative Example 2

The same film forming procedure as Example 1 was carried out except for a change of A layer thickness to obtain a biaxially oriented polyester film having an A/B laminated structure with an overall thickness of 10 μm. The Young's modulus (sum of moduli in the machine and transverse directions) was 1,030 kg/mm².

On this film were provided a magnetic layer and a back coat layer of the same compositions as used in Example 1 in the same method as Example 1, and the coated film was properly slit to make an 8 mm-VTR tape.

The properties of this film are shown in Table 2. Even though the polyester A layer is made of a polyester capable of plastic deformation and flattening by calendering treatment, this layer is not sufficiently flattened since its thickness is less than 0.05 μm. Consequently, the tape is poor in RF output and tape modulation noise level.

Comparative Example 3

The same film forming procedure as Example 1 was carried out except for a change of A layer thickness to obtain a biaxially oriented polyester film having an A/B laminated structure with an overall thickness of 10 μm. The Young's modulus (sum of moduli in the machine and transverse directions) was 500 kg/mm$^2$.

On this film were provided a magnetic layer and a back coat layer of the same compositions as used in Example 1 in the same method as Example, and the coated film was properly slit to make an 8 mm-VTR tape.

The properties of this tape are shown in Table 2. Since the polyester A layer is capable of plastic deformation and flattening by calendering treatment, the magnetic layer surface is also flat, and consequently, the tape is improved in RF output and tape modulation noise level. However there took place tape elongation during recording and reproduction due to low mechanical strength as a magnetic tape.

TABLE 1

|  | Example 1 | Example 2 | Example 3 | Example 4 | Example 5 |
|---|---|---|---|---|---|
| Polyester A layer Polyester | mol % TPA: 80 IPA: 20 EG: 30 BG: 70 | mol % TPA: 80 IPA: 20 EG: 30 BG: 70 | mol % TPA: 80 IPA: 20 EG: 30 BG: 70 | mol % TPA: 80 IPA: 20 EG: 30 BG: 70 | mol % TPA: 80 IPA: 20 EG: 30 BG: 70 |
| Thickness $t_A$ | 2.0 μm | 1.0 μm | 1.0 μm | 1.0 μm | 1.0 μm |
| Polyester B layer | PET | PET | PET | PET | PEN |
| Composition | C.B.: 0.5% | C.B.: 0.5% | C.B.: 0.5% | C.B.: 0.5% | SiO$_2$: 0.3% |
| Magnetic layer thickness $t_M$ | 0.1 μm | 1.0 μm | 1.0 μm | 1.0 μm | 0.5 μm |
| $t_M + t_A$ | 2.1 μm | 2.0 μm | 2.0 μm | 2.0 μm | 1.5 μm |
| Young's modulus in longitudinal direction * | 410 | 460 | 540 | 510 | 580 |
| Degree of plastic deformation | A | B | B | B | B |
| RF output at 7.7 MHz | ±0.0 dB | ±0.4 dB | ±0.4 dB | ±0.4 dB | ±0.2 dB |
| Center plane average roughness (SRa) | 10 nm | 7 nm | 7 nm | 7 nm | 8 nm |
| Tape modulation noise | ±0.0 dB | ±0.0 dB | ±0.0 dB | ±0.0 dB | ±0.0 dB |

(Note)
*: Young's modulus in the longitudinal direction of the magnetic tape (kg/mm$^2$)
Abbreviations:
TPA: terephthalic acid, IPA: isophthalic acid, EG: ethylene glycol, BG: 1,4-butanediol, C.B.: carbon black, SiO$_2$: spherical silica,

TABLE 2

|  | Comp. Example 1 | Comp. Example 2 | Comp. Example 3 |
|---|---|---|---|
| Polyester A layer Polyester | mol % TPA: 100 | mol % TPA: 80 | mol % TPA: 80 |

TABLE 2-continued

|  | Comp. Example 1 | Comp. Example 2 | Comp. Example 3 |
|---|---|---|---|
| composition | EG: 100 | IPA: 20 EG: 30 BG: 70 | IPA: 20 EG: 30 BG: 70 |
| Thickness $t_A$ | 2.0 μm | 0.03 μm | 5.0 μm |
| Polyester B layer | PET | PET | PET |
| Composition | C.B.: 0.5% | C.B.: 0.5% | C.B.: 0.5% |
| Magnetic layer thickness $t_M$ | 0.1 μm | 0.5 μm | 0.1 μm |
| $t_M + t_A$ | 2.1 μm | 0.53 μm | 5.1 μm |
| Young's modulus in longitudinal direction * | 490 | 480 | 230 |
| Degree of plastic deformation | D | D | A |
| RF output at 7.7 MHz | −4.8 dB | −6.5 dB | −0.9 dB |
| Center plane average roughness (SRa) | 17 nm | 21 nm | 5 nm |
| Tape modulation noise | −4.2 dB | −5.0 dB | ±0.0 dB |

(Note)
*: Young's modulus in the longitudinal direction of the magnetic tape (kg/mm$^2$)
Abbreviations:
TPA: terephthalic acid, IPA: isophthalic acid, EG: ethylene glycol, BG: 1,4-butanediol, C.B.: carbon black,

What is claimed is:

1. A magnetic recording medium comprising a biaxially oriented, laminated polyester film having a Young's modulus in the longitudinal direction of not less than 350 kg/mm$^2$, which is produced by coextrusion, comprising a polyester A layer subject to plastic deformation by calendaring treatment at 60° to 100° C. under a linear pressure of from 100 to 300 kg/cm, and wherein the polyester A layer has a first thickness and a calendared thickness and wherein the plastic deformation ratio of said calendared thickness to said first thickness is less than 0.94, and a polyester B layer comprising polyethylene terephthalates or polyethylene naphthalates, the polyester B layer containing particles having an average particle size of 0.001 to 5.0 µm; and a magnetic layer formed on the surface of the polyester A layer and composed of a magnetic substance dispersed in a resin binder, the thickness ($t_A$) of the polyester A layer in said magnetic recording medium and the thickness ($t_M$) of the magnetic layer in said magnetic recording medium satisfying the following formulae at the same time, $$0.01 \text{ µm} \leq t_M \leq 2.0 \text{ µm} \quad (1)$$

$$0.05 \text{ µm} \leq t_A \quad (2)$$

$$t_A + t_M \leq 5 \text{ µm} \quad (3).$$

2. A magnetic recording medium according to claim 1, wherein the Young's modulus in the transverse direction is not less than 350 kg/mm², and the sum of the Young's modulus in the longitudinal direction and the Young's modulus in the transverse direction is not less than 700 kg/mm².

3. A magnetic recording medium according to claim 1, wherein the plastic deformation ratio of the calendared thickness to the first thickness of the polyester A layer is less than 0.80.

4. A magnetic recording medium of claim 1, wherein the plastic deformation ratio of the polyester A is less than about 0.50.

5. A magnetic recording medium of claim 1, wherein the polyester of the polyester A layer has a crystal melting point from between about 50° to about 270° C., a glass transition temperature of less than about 60° C., and a Vicat softening temperature of less than about 60° C.

6. A magnetic recording medium comprising a biaxially oriented, laminated polyester film having a Young's modulus in the longitudinal direction or not less than 350 kg/mm², said film comprising a first polyester layer and a second polyester layer containing particles having an average particle size of 0.001 to 5.0 µm, which are coextruded, the first polyester layer being subject to plastic deformation by calendaring treatment at 60° to 100° C. under a linear pressure of from 100 to 300 kg/cm and said first polyester layer has a first thickness and a calendared thickness, and having a plastic deformation ratio of said calendared thickness to said first thickness of less than 0.94;

a magnetic layer formed on the surface of said first polyester layer, said magnetic layer comprising a magnetic substance dispersed in a resin binder, the thickness ($t_A$) of the first polyester layer in said magnetic recording medium and the thickness ($t_M$) of the magnetic layer in said magnetic recording medium satisfying the following formulae at the same time.

$$0.01 \text{ µm} \leq t_M \leq 2.0 \text{ µm} \quad (1)$$

$$0.05 \text{ µm} \leq t_A \quad (2)$$

$$t_A + t_M \leq 5 \text{ µm} \quad (3).$$

7. A magnetic recording medium of claim 6, wherein the polyester of the first polyester layer has a crystal melting point from between about 50° to about 270° C., a glass transition temperature of less than about 60° C., and a Vicat softening temperature of less than about 60° C.

8. A magnetic recording medium of claim 6, wherein the polyester of the first polyester layer is obtained by polycondensing a diol and a dicarboxylic acid;

the diol being selected from the group consisting of ethylene glycol, propanediol, butanediol, neopentyl glycol, pentanediol, hexanediol, octanediol, decanediol, cyclohexanedimethanol, diethylene glycol, triethylene glycol, polyethylene glycol, and tetramethylene glycol;

the dicarboxylic acid being selected from the group consisting of terephthalic acid, isophthalic acid, phthalic acid, naphthalenedicarboxylic acid, 4-sulfonylisophthalic acid metal salts, biphenyl-dicarboxylic acid, succinic acid, glutaric acid, adipic acid, cyclohexanedicarboxylic acid, oxalic acid, and malonic acid.

9. A magnetic recording medium of claim 6, wherein the plastic deformation ratio of the first polyester layer is less than about 0.80.

10. A magnetic recording medium of claim 6, wherein the plastic deformation ratio of the first polyester is less than about 0.50.

* * * * *